United States Patent Office 3,120,543
Patented Feb. 4, 1964

---

3,120,543
INTERMEDIATES AND PROCESS FOR
DITHIOLIUM COMPOUNDS
Erwin Klingsberg, Mountainside, N.J., assignor to American Cyanamid Company, New York, N.Y., a corporation of Maine
No Drawing. Filed Nov. 18, 1960, Ser. No. 70,146
6 Claims. (Cl. 260—327)

This application is a continuation-in-part of application Serial No. 27,254, filed May 6, 1960.

1,2-dithiolium compounds are a new class of compounds having a pseudoaromatic cationoid ring system. As shown in my parent application, these compounds are useful for the preparation of basic dyes for acrylic fibers.

This invention relates to a new process and intermediates for the preparation of new and useful dithiolium salts of the formula:

(I)

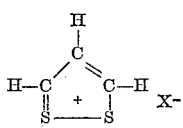

wherein X is an anion.

In accordance with the process of this invention, a dialkyl fumarate (e.g., diethyl fumarate and dipropyl fumarate) is treated with sulfur to form a new 5-carbalkoxy-1,2-dithiole-3-one of the formula:

(II)

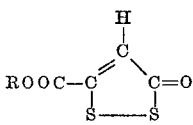

wherein R is an alkyl corresponding to the alkyl of the fumaric ester. Reaction is conducted by heating a mixture of the reactants to a boiling temperature. The proportion of the reactants is not critical, but preferably from one to five parts of sulfur are used for each ten parts of the fumarate. Fractionation of the product in vacuo gives the desired 1,2-dithiole-3-one of the Formula II.

Compound II is next treated with a reagent capable of converting the 3-carbonyl group to a 3-thiocarbonyl group. Suitable for this puropose is phosphorus pentasulfide. This conversion is effected by heating a mixture of the phosphorus pentasulfide and compound II. Proportions are not critical, but an excess of $P_2S_5$ is preferred. The reaction may be carried in a suitable solvent for the reactants, such as pyridine. The reaction product is the new compound of the formula:

(III)

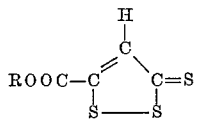

wherein R is as hereinbefore defined. It may be further purified by recrystallization.

The ester of Formula III is next saponified to yield the corresponding new free acid of the formula:

(IV)

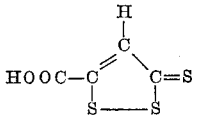

Unexpectedly, it has been found that this step is readily accomplished by use of an aqueous sodium sulfide solution as the saponification reagent. Saponification is readily effected even at room temperature in an aqueous solution of the ester (III) and at least molar amounts of sodium sulfide.

Treatment of the free acid of Formula IV with a peracid simultaneously effects oxidation and decarboxylation to yield the desired dithiolium compound as the hydrogen sulfate salt. Peracids suitable for this purpose include peracetic acid, perphthalic acid, perfluoroacetic acid and perbenzoic acid. Treatment with the peracid is effected at ambient temperature by gradual addition of about three moles of the acid to give the compound of Formula I wherein X is $HSO_4$. The product is readily converted by conventional means to other salts within the scope of Formula I, e.g., the iodide, chloride, bromide, perchlorate, etc.

Compounds of Formula I are useful compounds which may be converted to dyestuffs useful for dyeing acrylic fibers as described in my copending application, Serial No. 27,254. Thus, on treatment with an aromatic tertiary amine (e.g., N,N-dimethyl aniline) under conventional condensation conditions (e.g., in alcoholic solution) they yield the corresponding tertiary amino aromatic condensation products which dye arcylic fibers intense shades.

The following example is presented to further illustrate this invention. Parts are by weight unless otherwise expressed.

EXAMPLE 1

1,2-Dithiolium Iodide

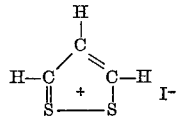

Fifty parts by volume of diethyl fumarate and 15 parts of sulfur are boiled together for two hours. The reaction product is fractionated to yield 5-carbethoxy-1,2-dithiole-3-one, (II, R=Et) an oil of B.P. 125–140° C./5 mm.

Ten parts of 5-carbethoxy-1,2-dithiole-3-one are mixed with six parts of phophorus pentasulfide and 75 parts of pyridine and the mixture is heated to reflux for 1½ hours. The product is dissolved in $Et_2O$ and treated with mercuric chloride (1 equivalent) in acetone solution to yield a precipitate which then suspended in 100 parts of dilute HCl and then treated with $H_2S$ until conversion to mercuric sulfide is complete. The precipitate is filtered off and the filtrate extracted three times with fifty parts of ether each time. The ether extracts are combined, dried and evaporated. Crystallization of the solid from hexane yields 5-carbethoxy-1,2-dithiole-3-thione as a purplish solid melting at about 65–66° C.

One part of the 5-carbethoxy-1,2-dithiole-3-thione is saponified by dissolving in a solution of five parts of sodium sulfide nonahydrate in 200 parts of water. The solution is allowed to stand at room temperature until saponification is complete. Acidification with HCl and then crystallization of the reaction product from benzene-hexane yields the compound 5-carboxy-1,2-dithiole-3-thione (IV) as a purple-brown crystalline solid melting at about 136–139° C. (with dec.)

To 4.6 parts of 5-carboxy-1,2-dithiole-3-thione dissolved in 125 parts of acetone are added, gradually at 25° C., 15 parts of 40% peracetic acid. The product, dithiolium hydrogen sulfate, is precipitated as the iodide by treatment with hydriodic acid. The iodide crystallizes from propanol as orange needles melting at 179–181° C. (with dec.).

I claim:
1. A compound of the formula:

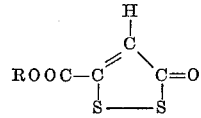

wherein R is alkyl selected from the group consisting of ethyl and propyl.

2. 5-carbethoxy-1,2-dithiole-3-one.
3. A compound of the formula:

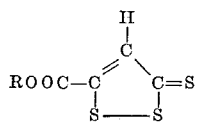

wherein R is alkyl selected from the group consisting of ethyl and propyl.

4. 5-carbethoxy-1,2-dithiole-3-thione.
5. A compound of the formula:

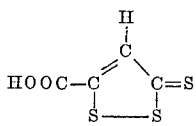

6. Process for the preparation of 1,2-dithiolium hydrogen sulfate, which comprises simultaneously oxidizing and decarboxylating a compound of the formula:

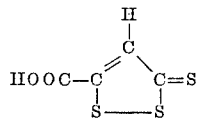

by treatment with an organic peracid selected from the group consisting of peracetic, perphthalic, perfluoroacetic and perbenzoic acids; and then separating the product thus formed.

References Cited in the file of this patent
UNITED STATES PATENTS
2,653,910    Airs et al. _____ Sept. 29, 1953

OTHER REFERENCES

Holleman et al.: Textbook of Inorganic Chemistry, second English edition, John Wiley & Sons, New York, N.Y. (1907), pp. 316 and 322.

Schmitt et al.: Compt. Rend., vol. 230, pages 551–4 (1950).

Lazac's et al.: Bull. Soc. Chim., France, 1950, pages 1243–4.

Noller: Chemistry of Organic Compounds, 2nd edition, 1957, page 170.